United States Patent [19]
Gordon et al.

[11] 3,978,524
[45] Aug. 31, 1976

[54] ADAPTER FOR PLAYING REMOTELY LOCATED ELECTRONIC APPARATUS THROUGH A MAGAZINE TAPE RECORDER/REPRODUCER

[76] Inventors: Bernard Gordon, 1745 W. Devon Ave., Chicago, Ill. 60660; Hugo G. Hernandez, 7019 W. Diversey, Chicago, Ill. 60635

[22] Filed: Sept. 3, 1974

[21] Appl. No.: 502,778

[52] U.S. Cl. ............................. 360/137; 179/1 AT
[51] Int. Cl.$^2$ ................. G11B 31/00; G11B 23/00; H04M 1/00
[58] Field of Search ...................... 360/93, 137, 94; 179/100.11, 1 AT, 2 E

[56] References Cited
UNITED STATES PATENTS

| | | | |
|---|---|---|---|
| 3,582,965 | 6/1971 | De Metrick | 360/137 |
| 3,644,684 | 2/1972 | Tsuji | 179/100.11 |
| 3,662,123 | 5/1972 | Huber | 179/100.11 |
| 3,700,826 | 10/1972 | O'Neal | 360/137 |

FOREIGN PATENTS OR APPLICATIONS

| 1,106,720 | 3/1968 | United Kingdom | 179/100.11 |
|---|---|---|---|

OTHER PUBLICATIONS

Haynes, "Transistor Circuits for Magnetic Recording", 1964, Bobbs–Merrill Co., Inc., New York pp. 133–134.

*Primary Examiner*—Robert S. Tupper
*Attorney, Agent, or Firm*—Alter and Weiss

[57] ABSTRACT

An adapter is built into a standard magazine (such as a cartridge or cassette) for a magnetic tape recorder. The adapter includes electronic equipment which matches the characteristics of an input signal—such as from a microphone—to the characteristics of signals recorded on magnetic tape. Hence, the matched signals may be inductively applied from the adapter to the pick-up head of the tape recorder. This way, the audio system of the recorder may serve any of many different purposes such as a public address sytem, a sound system, or the like.

11 Claims, 3 Drawing Figures

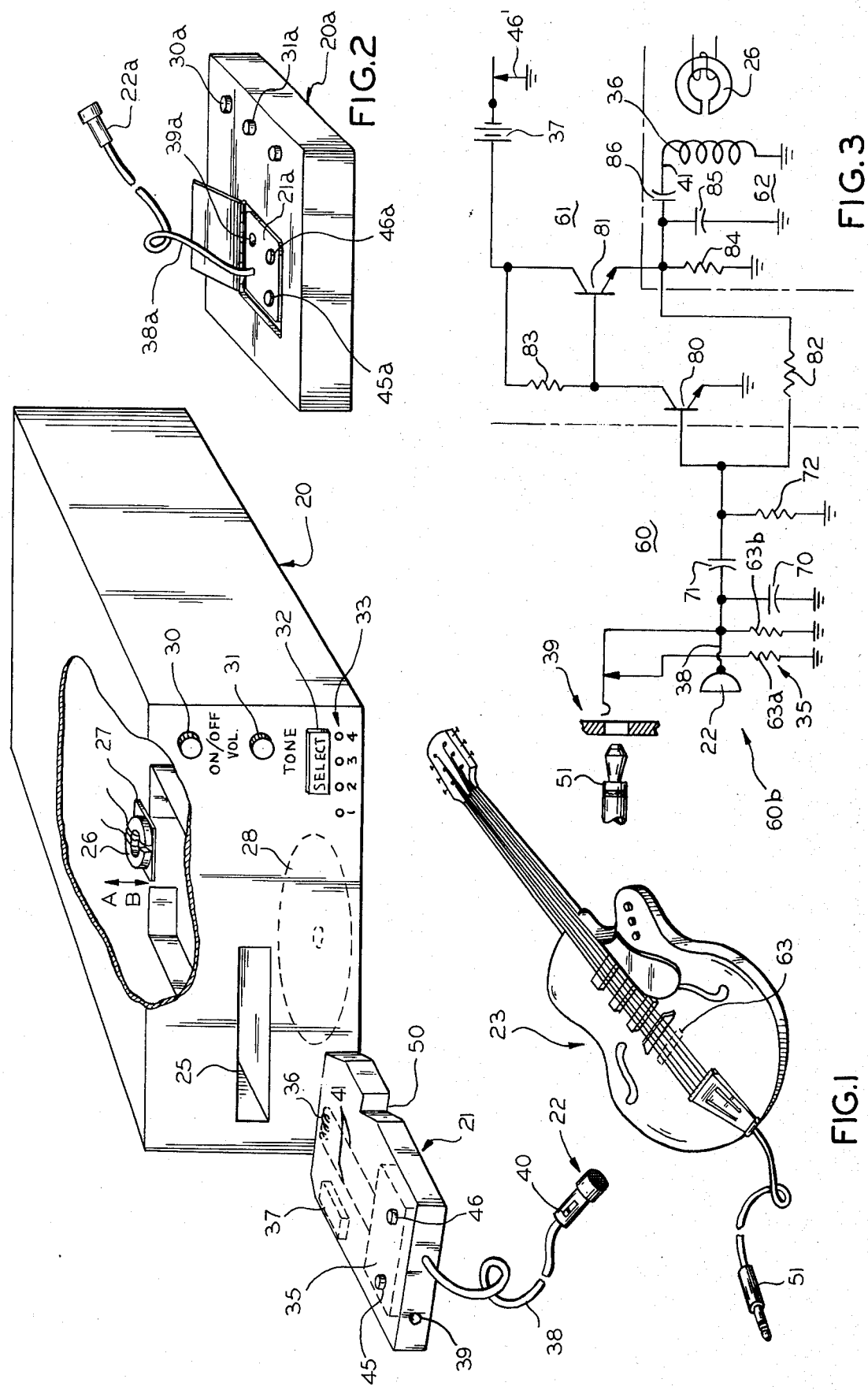

ADAPTER FOR PLAYING REMOTELY LOCATED ELECTRONIC APPARATUS THROUGH A MAGAZINE TAPE RECORDER/REPRODUCER

This invention relates to adapters for electronic amplification equipment and more particularly to audio frequency input adapters for use with magnetic tape recorders.

In general, magnetic tape recording and reproducing apparatus has developed to a stage wherein magnetic tape may be purchased in cartridges, cassettes, or other magazines for simple insertion into a recorder/reproducer. Thus, there is a large popular market supported by many widely owned, relatively low cost, recording or reproducing devices. For convenience of expression, the terms "magnetic recorders" and "magnetic recording" are used hereinafter as generic to both recording and reproducing.

These devices contain electronic amplifiers, loud speakers, controls, or the like, which could have general utility for use with almost any of many audio frequency input devices. However, it has not heretofore been practical to convert these magnetic tape recorders to use with a wide range of different input devices, such as microphones, electric guitars, phonograph turntables, or the like. Primarily, this is because each input device and each tape recorder tends to have its own frequency response characteristics. Therefore, any attempt to randomly interconnect miscellaneous and non-related devices generally results in mismatches which produce less than desirable results.

There are a number of reasons why it is desirable to find ways of utilizing the audio portion of magnetic recorder apparatus in the desired manner. For example, there is a novelty, ego, and self-fulfillment appeal of being able to accomplish things which others cannot do, such as to speak over an amplified sound system. There is also a need for a convenient and low cost public address system, as when games are played at parties, for example. Sometimes, there is a need for a portable self-powered audio frequency amplification system, as when an automobile tape recording cartridge system is used at a beach party or to amplify the output of a musical instrument such as an electric guitar, for example. Still other uses will occur to those who are skilled in the art.

Accordingly, an object of this invention is to provide new and improved means for and methods of using the audio portion of virtually any tape recorder in connection with other forms of audio input devices. Here, an object is to utilze a tape recorder to provide a public address system, without requiring a modification of the recorder in any manner. In particular, an object is to provide such a convenience system wherein the various components are completely compatible with each other.

Still another object of this invention is to provide adapters for such systems which may be used with almost any magnetic tape recorder and without regard as to whether it is in an automobile, home, on the beach, or the like.

In keeping with an aspect of the invention, these and other objects are accomplished by means of an adapter built into a standard magazine, such as a cartridge or cassette housing. The adapter comprises electronic pre-amplification equipment which matches the characteristics of the input signal to the characteristics of signals which are recorded on magnetic tape. Then, the matched signals are fed to any suitable inductor winding, which may or may not have an iron core, and may be positioned near the recorder/reproducer pick-up head. This way, there may be an inductive coupling between the winding and the pick-up head whenever the magazine housing is inserted into the recorder.

The nature of this adapter may be understood best from a study of the attached drawing wherein:

FIG. 1 is a perspective view (partly broken away) of a system comprising an eight track cartridge type magnetic tape recorder of any conventional design, and an inventive adapter with various audio frequency inputs such as a microphone and an electric guitar.

FIG. 2 is a similar view of a cassette system using another inventive adapter; and FIG. 3 is a schematic circuit diagram which shows the electronic circuitry used in the adapter to match the audio frequency characteristics of an input device to the characteristics of a magnetic recorder.

In general, the system of FIG. 1 is here shown as comprising a magnetic recorder 20, an adapter 21 with exemplary audio inputs, such as a microphone 22 and an electric guitar 23. Preferably, the microphone is highly directional, for close talking, in order to screen out background noise and feedback. The guitar 23 symbolically depicts almost any form of audio frequency input device. Nevertheless, a special feature of the invention is that the recorder 20, microphone 22, guitar 23, and any other suitable input device may be entirely conventional. No modifications are required for these devices to be assembled into a system.

In greater detail, the magnetic tape recorder 20 comprises a housing having therein a receptical or guide way 25 which is shaped and dimensioned to receive a standard eight track tape cartridge. A magnetic pick-up head 26 is positioned inside the recorder and at the end of the guide way to record or to detect signals which are on the magnetic tape. Usually, the pick-up head 26 is mounted on an elevator support 27 which may be moved up or down in the directions A, B. This way the pickup head 26 may be positioned adjacent to any of the eight tracks (not shown) on the tape. The pick-up head 26 is connected to and used with internal electronic equipment built into the recorder and including a loud speaker 28. Hence, the recorder has a self-contained audio frequency amplification system.

The recorder 20 includes its own controls for its audio system. For example, an on/off knob 30 may also control the volume. Knob 31 may control the tone of the output sound. A push button 32 controls a device for raising or lowering the elevator support 27 and the pick-p head 26 to select a track on the magnetic tape. Any suitable number of lights 33 may be provided for identifying the tracks on the tape that is then being traced by the pick-up head.

All of the equipment identified by the reference numerals 25-33 may be entirely conventional. There is no need to modify this equipment in any form in order to use the invention.

According to the invention, adapter 21 contains an electronic pre-amplification characteristic control circuit which is housed inside the shell of an entirely conventional magazine, such as an eight track tape cartridge, for example. More particularly, the adapter 21 comprises an electronic pre-amplification circuit 35, an inductor winding 36, and a battery 37 for powering the circuit 35. Wires 41 constitute means for connecting the inductor 36 to the output end of pre-amplification electronic circuit means 35. The input end of electronic circuit 35 is connected to any suitable source of audio frequency signals, such as microphone 22 on the end of a cable 38 and an input jack 39. The electronic circuit may be controlled from a push-to-talk switch 40 on the microphone or from any controls built into the guitar. Thus, for example, whenever the user wishes to use the microphone, he will only have to operate switch 40 in order to control the inventive adapter part of the system. The audio system itself is controlled by the recorder controls 30–33.

The pre-amplification electronic circuitry 35 inside the adapter 21, may also be controlled from knobs 45, 46 built into the standard cartridge housing. For example, these knobs 45, 46 may be "loudness" or "tone" controllers which are able to raise or lower either or both ends of frequency response curve of circuit 35. Likewise, the circuitry 35 may also be designed to serve any specialized needs of any particular input device. Thus, if the microphone 22 has a unique peak at, say, the high frequency end of the audio spectrum that peak may be lowered while perhaps the low frequency end is raised. Since cost is an important consideration in any device which may be considered a novelty, these knobs 45, 46 may also be omitted, and the system may then be specifically designed for a particular input, such as a microphone. On the other hand, the inventive device is also useful in connection with high quality tape systems; hence, it is also desirable to provide equally high quality adapter controls 45, 46. Thus, the invention is designed to provide a maximum flexibility of either low cost or high quality.

The inventive adapter 21 fits into the standard cartridge guideway 25 and is held in position by any means normally used to hold a comparable magazine in tape recorder 20. For example, many such guideways include a detent (not shown here) which fits into notch 50 on adapter 21. When the adapter 21 is so held in guideway 25, the inductor winding 36 is brought closely enough into the vicinity of the pick-up head 26 so that the head experiences the magnetic field fluctuations of winding 36 regardless of the position of the elevator mechanism 27. Thus, the audio frequency signal modulating the variable magnetic field surrounding winding 36 and a magnetic signal recorded on a track of a normal magnetic tape have essentially the same effect upon the pick-up head 26. Accordingly, the normal audio system in the recorder 20 plays back a sound derived from the audio signal modulating the magnetic field of the inductor winding 36.

The jack 39 is also adapted to receive signals from any other suitable source of audio signals, such as that here illustrated by the electric guitar 23, and to apply them to the input of circuitry 35. It is only necessary to put plug 51 into the jack 39, to switch the input from microphone 22 to guitar 23, and to make any desired audio frequency response curve adjustments, at knobs 45, 46. The knobs 30, 31 may also be manipulated to adjust the volume and tone of the output sound. Thereafter, the signal from the guitar 23 is amplified, and reproduced as sound, in a normal manner, by the audio system in the recorder 20.

FIG. 2 shows essentially the same thing that is shown by FIG. 1. The same reference numerals identify corresponding parts in these two figures, except that the suffix *a* is added to the reference numerals in FIG. 2. The point is that the invention is not limited to cartridges, but may also be used by any other type of magazine such as a cassette, for example. Accordingly the term "magazine" is used in the claims in a manner which is generic to all cartridges, cassettes, and similar devices.

One example of the pre-amplification electronic circuitry 35 which may be built into the magazine adapter 21 is shown in FIG. 3. Here, the circuitry is on the extremely simple and low cost end of the scale. Other and more sophisticated circuits may also be used.

The major sub-circuits of circuit 35 are divided by dot-dashed lines and may be identified as input circuit 60, amplifier and characteristic response shaping circuit 61, and output circuit 62.

The input circuit 60 is here shown as leading from the microphone 22 and a guitar pick-up connected to plug 51, respectively, to an input impedance selection switch 45. The microphone 22 is connected via a coupling device and filter circuit comprising capacitors 70, 71 and resistor 72 which adapt the microphone input signal characteristics to the characteristics of the amplifier and response shaping circuit 61. The guitar pick-up has a higher impedance than the microphone; therefore, an insertion of plug 51 into jack 39 opens a set of contacts which disconnects resistor 63a which is normally connected in parallel with resistor 63b. Thus, the input impedance to the circuit of FIG. 3 is higher for the guitar than for the microphone. Likewise, any other suitable input control device may also be provided. If desired, switch 45 may also be arranged to select either a microphone input or a guitar input.

The amplifier and frequency response shaping circuit includes a cascaded pair of NPN transistors 80, 81. The transistor 80 (an amplifier) receives base bias via resistor 72 and a stabilizing negative feed back via resistor 82. Resistor 83 is a collector load for the transistor 80, which load is connected to battery 37 and an on/off switch 46.

The transistor 81 is here shown as being connected in an emitter follower configuration, primarily to couple amplifier 80 to the inductor winding 36 with good isolation. The base of transistor 81 is connected to the collector of transistor 80. The emitter of transistor 81 is connected to feedback resistor 82, to load resistor 84, and to a stabilizing noise bypass capacitor 85. The capacitor 86 A.C. couples the emitter of transistor 81 to the inductor winding 36, while blocking D.C.

From the foregoing, it should be apparent that the preamplification circuit 35 is adapted to pass signals from virtually any audio frequency input source to the inductor winding 36, with a frequency response characteristic that matches the corresponding characteristic of a magnetic tape recording. Hence, virtually any magnetic recorder may be converted into a general purpose audio amplification system merely by plugging in a conventional magazine housing constructed in the form of the inventive adapter.

Depending upon the amount of money which one is willing to spend, the adapter may provide virtually any degree of sophistication ranging from the simplest single channel, one function input (e.g. a microphone) to a high quality (e.g., music system) multichannel input. For a higher quality music system, the amplifier will preferably have a wider band and higher fidelity than is required for voice signals alone.

Also, the invention contemplates use with any known adapter equipment such as stereo speakers. Thus, for example, with the described inductor coupling, both gaps of a stereo pick-up head 26 will pick up the same signal. Therefore, the stereo speaker jacks, which are often provided for the recorder 20 may receive separate loud speakers. Still other modifications will occur to those who are skilled in the art.

Accordingly, the appended claims are to be construed to cover all equivalent structures falling within the true scope and spirit of the invention.

I claim:

1. An adapter for playing remotely located electronic apparatus through a magazine type magnetic player/recorder having a pick-up head, said adapter being housed in a standard magazine housing, said adapter comprising input connector means on said magazine housing for connection to the remotely located electronic apparatus to receive output signals therefrom, electronic preamplification circuit means connected to said input connector means, inductor winding means coupled to said electronic preamplification circuit means, said inductor winding being located at a position in said housing to couple with said pick-up head when said magazine housing is operatively mounted on said player/recorder, means for varying the impedance of said electronic preamplification circuit means as a function of the impedance of the particular electronic apparatus attached to said input connector means of said adapter to provide an impedance match, and d.c. power source means for independently powering said electronic preamplification circuit means.

2. The adapter of claim 1 wherein a microphone is coupled to said input connector means.

3. The adapter of claim 1 wherein said input connector means includes a plurality of input channels, said input channels each having impedance adjusting means which automatically alter said electronic preamplification circuit means to compensate for the different impedance the particular electronic apparatus connected thereto.

4. The adapter of claim 3 and said means for varying includes manually actuated control means on said adapter housing.

5. The adapter of claim 1 wherein said electronic preamplification circuit means comprises, in cascade, an input filter and coupling means, at least one amplifier means, and output coupling means.

6. The adapter of claim 5 and a microphone connected to said input connector means.

7. The adapter of claim 6 wherein said output coupling means comprises a transistor connected in an emitter follower configuration and coupled to said inductor winding via a coupling capacitor.

8. The adapter of claim 7 wherein said amplifier means comprises a second transistor having its base connected to said input filter and coupling device, its collector connected to said emitter follower, and a feedback resistor coupled between the emitter of said emitter follower and the base of said second transistor.

9. The adapter of claim 1 wherein said housing is a housing in the geometrical form of a four track cartridge.

10. The adapter of claim 1 wherein said housing is in the geometrical form of a magnetic tape cassette.

11. The adapter of claim 1 wherein said housing is a housing in the geometrical form of an eight track cartridge.

* * * * *